United States Patent [19]

Leanna et al.

[11] 4,341,056

[45] Jul. 27, 1982

[54] MACHINE FOR COMPRESSION BAND PACKAGING

[75] Inventors: Dale D. Leanna, Little Suamico; Allen R. Jorgensen, Abrams; Eugene W. Wittkopf, Suamico, all of Wis.

[73] Assignee: Magna-Graphics Corporation, Oconto Falls, Wis.

[21] Appl. No.: 130,814

[22] Filed: Mar. 17, 1980

[51] Int. Cl.³ .................. B65B 11/30; B65B 13/20
[52] U.S. Cl. .......................................... 53/529; 53/234; 53/553; 53/586
[58] Field of Search .................. 53/399, 438, 456, 466, 53/228, 229, 232, 233, 234, 261, 529, 556, 575, 586, 553; 100/3, 18

[56] References Cited

U.S. PATENT DOCUMENTS

| | | | |
|---|---|---|---|
| 1,059,621 | 4/1913 | Livingston | 53/586 |
| 1,885,910 | 11/1932 | Gwinn | 53/234 X |
| 2,005,846 | 6/1935 | Parsons | 53/234 X |
| 2,026,284 | 12/1935 | Metternich | 100/3 |
| 2,179,264 | 11/1939 | Lobasso | 53/586 |
| 2,504,993 | 4/1950 | Lobasso | 53/529 X |
| 2,568,260 | 9/1951 | Spagnoli | 53/587 X |
| 2,954,655 | 10/1960 | Seragnoli | 53/234 |
| 3,181,956 | 5/1965 | Clark | 53/261 X |
| 3,191,356 | 6/1965 | Zelnick | 53/229 X |
| 3,551,260 | 12/1970 | Catherwood | 53/553 |
| 3,564,810 | 2/1971 | Faletti | 53/228 X |
| 3,638,394 | 2/1972 | Winokur | 53/261 X |
| 4,028,866 | 6/1977 | Langen | 53/575 |

FOREIGN PATENT DOCUMENTS

1427935  3/1976  United Kingdom .................. 53/556

Primary Examiner—John Sipos
Attorney, Agent, or Firm—James E. Nilles

[57] ABSTRACT

Packs of product move along a defined path, compressed in the grip of carrier jaws. A pair of webs of thermoplastic sheet material move towards said path from opposite sides thereof and are joined at a heat-fused seam to form an effective continuous strip across said path and into which a pair of carrier jaws moves with its pack. Pressure jaws converge just behind the carrier jaws to form the strip into a loop around the carrier jaws and produce two parallel, slightly spaced heat-fused seams between which the webs are severed and one of which connects the ends of said loop to form a band around the carrier jaws while the other connects the webs into a strip for formation of the next band. Until the band-completing seam has cooled, the carrier jaws keep the pack compressed enough to prevent seam rupturing tension on the band, then diverge enough to tension the band slightly, whereupon band and pack, in unison, are slid endwise out of engagement with the carrier jaws. The two parallel fused seams and the cut between them are produced simultaneously by a single strip-like electrically heated element.

4 Claims, 16 Drawing Figures

MACHINE FOR COMPRESSION BAND PACKAGING

FIELD OF THE INVENTION

This invention relates to machinery for the packaging of resiliently compressible products such as stacked paper towels and stacked paper napkins; and the invention is more particularly concerned with apparatus for forming compact packages, each comprising a quantity of a resiliently compressible product surrounded by a confining band of thermoplastic material by which the product is kept compressed until the band is broken.

BACKGROUND OF THE INVENTION

Commercial and industrial purchasers of paper towels and paper napkins wish to receive such products in packages that are as compact as possible. In many cases each such package is intended to provide a fill for a dispenser, and the package should contain the largest number of units that can be fitted into the dispenser. Since such a product occupies much less space when compressed than when unconfined, the product should be under substantial compression in the package.

Some prior compression packages have comprised cardboard tubes of rectangular cross-section, into which precompressed packs of product were inserted. Although these were relatively satisfactory, the cardboard tubes were also relatively expensive.

Paper bands have also been used to confine stacks of paper towels or the like under compression. Although low in cost, paper bands could sustain only limited tension and therefore did not lend themselves well to the making of an adequately compact package. Furthermore, packages comprising paper bands had a tendency to be somewhat out of straightness, or to have a rumpled edge, or in some other way to be deficient in clean-cut neatness.

Light-weight thermoplastic sheet material, which is tough, inexpensive and somewhat elastic, is very suitable to be formed into bands or sleeves for compression packages, but its employment for the purpose poses numerous problems. Some of these problems arise from the nature of that material, which is very supple and tends to be charged with static electricity that makes it sticky. Hence control of the material requires that every edge portion of it shall at all times be either supported or maintained under tension, substantially all along its length. Other problems are posed by the need for bonding such material by forming heat fused seams that have little strength until they are cooled substantially to ambient temperature.

To avoid these problems, one procedure heretofore used for obtaining a compact banded package with thermoplastic sheet material was to form the material into a band around a relatively uncompressed pack of product, and then heat-shrink the band to compress the product. Expensive energy had to be expended for the heat shrinking step, and in the resultant package the product was not necessarily compressed to the fullest or most desirable extent.

In some machines heretofore employed for compacted band packaging of compressible product, each band was formed from a web of thermoplastic sheet material that was drawn off of a braked supply roll under lengthwise tension, and the tension thus imparted to the band was relied upon to compress the product. Machines which operated on this principle tended to be slow because of the braking of the supply roll. Furthermore, the amount of compressive compaction that could be imparted to the product, which depended upon the tensioned stretching of the band material, tended to be limited.

The present invention contemplates a packaging machine whereby individual wrapper bands are formed from thermoplastic sheet material which comes to the wrapping or banding zone in continuous, substantially untensioned webs that are drawn off of unbraked supply rolls rotating continuously at steady rates. Since the band material is not substantially tensioned at the time it is looped around the product, the product must be kept under compression during the band forming step, and in fact it should then be under more compression than is desired for it in the finished package, so that it can subsequently expand into good holding engagement with the band. This poses the problem of providing holding means for maintaining the product under compression while a band is formed around it and cooperating means for so forming the band that the thermoplastic sheet material is always under control. Furthermore, the holding means and the band forming means must so cooperate that the band and the pack of product can eventually be separated from the holding means without also separating the product from the band.

These problems have been very satisfactorily solved in the machine of the present invention, but the solutions to these basic problems have brought in their train other problems of at least equal difficulty. In particular, the general arrangement and functioning of the apparatus contemplated by this invention entails a requirement for a very compact cutting and heat-bonding means whereby a cut can be made through flatwise superposed layers of thermoplastic sheet material and the layers can be substantially simultaneously heated-bonded to one another to form seams along both of the edges that result from the cut. To be completely satisfactory in a machine of the type contemplated by this invention, the cutting and heat bonding means must be capable of performing an operation quickly, must be able to repeat the operation at short intervals, but must nevertheless operate consistently even when there happen to be long intervals between successive cutting and heat-bonding operations. This is to say that the device should get hot enough to perform a cutting and heat-bonding operation in a very brief period of time, but it should nevertheless not overheat during the course of a very long delay between operating cycles.

One type of prior apparatus for performing a severing and seam-fusing function, disclosed in U.S. Pat. No. 2,686,556, to Gerber et al, comprised a high frequency generator having a frequency range on the order of 10 to 300 mega-Hertz. That apparatus may have functioned satisfactorily, but it would not be well suited to present requirements. In addition to the cost and inconvenience of providing the generator itself, its presence is now known to mandate costly and inconvenient safety precautions for protection of personnel from its high frequency radiations.

Resistance-heat cutting and heat-bonding devices were disclosed in U.S. Pat. No. 3,032,257, to Weber, and in U.S. Pat. No. 3,083,757, to Kraft et al; but in each of these a resistance heating element was embedded in a rather thick blade body, so that the device lacked the compactness and light weight that are important for the purposes of the present invention. More important, the heat that was abstracted from the blade body at each cutting and seam-fusing operation had to be replaced by conduction through the body from the embedded heating element, with the result that the device tended to have a slow cycle time; whereas if there was a long delay between successive operations the temperature of the blade body and heating element would continuously rise. Furthermore, in each of these disclosed devices the cutting portion of the blade body was on a narrow, sharp-edged, projecting portion of the body that encouraged radiation of heat, whereas the seam forming or heat-bonding portions of the body were more massive in relation to their surface areas and may well have remained hotter than the cutting portion, instead of being cooler than the cutting portion as is desired for reliable operation.

SUMMARY OF THE INVENTION

The general object of the present invention is to provide simple, fast-operating, compact, reliable and efficient packaging apparatus whereby a snug band or sleeve of light-weight thermoplastic sheet material can be placed around each of a succession of packs or stack-like assemblages of a compressible product such as paper towels, paper napkins, sponges or the like, to maintain the product under a predetermined amount of compression.

Another general object of this invention is to provide a packaging machine that forms packages in which resiliently compressible product is held under a predetermined degree of compression by a neat, tough band, said packaging machine being capable of operating at high rates of production but being nevertheless capable of operating efficiently at any rate slower than its maximum, so that it can form packages on demand, when and as product is fed to it.

Another object of the invention is to provide a band packaging machine of the character described whereby bands are formed from continuous webs of light thermoplastic sheet material that are drawn from supply rolls which are unbraked and which rotate continuously at a substantially steady rate while packaging is in progress, and whereby the band of each finished package is caused to be under tension around a quantity of resiliently compressible product, to maintain the product compressed to a predetermined extent; said machine being arranged to require a minimum of heat energy for forming the bands and none for tensioning them.

It is also an object of this invention to provide apparatus for automatically forming a band around a pack of resiliently compressible product while the product is maintained under compression, wherein no substantial tension is imposed upon the material comprising the band during the time that the band is being formed or during a subsequent interval in which its heat-fused seams are cooling, said apparatus being so arranged that after said seams have fully cooled, the band and the pack are maintained in their desired final relationship to one another while they are disengaged from means whereby the pack has been held under compression during forming of the band and cooling of its seams.

Another and more specific object of this invention is to provide apparatus for automatically placing a band of light-weight thermoplastic sheet material around each of a succession of packs of a compressible product such as paper towels, paper napkins or sponges as the packs move along a defined path and while each pack is compressively clamped between a pair of paddle-like carrier jaws, wherein the thermoplastic material is brought to said path in the form of two webs that are guided into said path from opposite sides thereof, and wherein the two webs are formed into a band for each pack, each band having two seams, one at the front of the pack, the other at its rear, the rear seam being formed substantially simultaneously with severing of the band from the webs and with connection of the webs with one another to provide the front seam for the next pack.

In connection with the last stated object of the invention it is a further specific object of the invention to provide a packaging machine of the character described wherein the formation of said two seams and the severing of the band from the webs is accomplished quickly and at relatively short intervals without imposition of tension upon the newly-fused seams, and wherein adequate cooling time is provided before tension is imposed upon the seams, but such cooling time is not provided at the sacrifice of a high rate of production.

Another specific object of the invention is to provide a band packaging machine of the character described whereby each band is formed from material severed from each of two webs and therefore has two heat-fused seams, and wherein simple means are provided for ensuring that the two pieces of material that comprise each band will be equal in length and the seams in the band will be neatly opposite one another and in nicely uniform positions on every package.

It is also a specific object of the invention to provide a very compact, inexpensive and light weight resistance-heated element for making a cut through flatwise contiguous sheets of thermoplastic material and for simultaneously heat bonding the sheets to one another along both sets of their edges that result from the cut, said element being one that has a short cycle time but nevertheless has no tendency to overheat during long delays between successive operations.

In general, the objects of the invention are achieved in apparatus having carrier means comprising carrier jaw members between which a quantity of resiliently compressible product is receivable and which are constrained to move in a forward direction along a defined path. The apparatus also comprises guide means whereby a pair of elongated webs of thermoplastic sheet material are guided towards said path from a pair of opposite sides thereof; first seam bonding means for forming a first seam that connects the adjacent ends of said webs, substantially all across the width of each, so that the connected end portions of the webs comprise a band strip which extends across said path and which is drawn out into a U-shaped open loop that embraces said jaw members as the jaw members move in said forward direction; pressure jaw means arranged to converge across said path from said opposite sides thereof and by which the opposite legs of said open loop are brought into contact with one another behind said jaw members; second seam bonding means carried by said pressure jaw members for forming a second seam substantially simultaneously with formation of said first seam, which second seam is parallel to said first seam, is spaced a small distance in said forward direction from said first seam, and forms said band strip into a closed band; and cutting means carried by the pressure jaw members and arranged to make a cut through the materials of both of said webs, which cut is made substantially simultaneously with formation of said first and second seams and is between those seams to sever said closed band from said webs.

The cutting and seam bonding means for forming said first and second seams and the cut between them is preferably the novel cutting and seam bonding means of this invention, which comprises a strip of metal that is of substantially uniform thickness substantially all across its width and along its length, said strip having lengthwise extending bends which define a ridge of substantially V-shaped cross-section that extends along the length of the strip intermediate its edges, and which further define portions of said strip at opposite sides of said ridge that are substantially flat and coplanar with one another. The ends of said strip are arranged for connection with terminals of an electric current source, for resistance heating of the strip. The strip has its flat coplanar portions overlying a substantially flat front surface of a support for the strip that is substantially electrically non-conductive but is capable of conducting heat, and said support conducts some heat away from said coplanar portions so that the apex portion of said ridge, being spaced forwardly from said front surface, is normally the hottest portion of said strip.

BRIEF DESCRIPTION OF DRAWINGS

In the accompanying drawings, which illustrate what is now regarded as a preferred embodiment of the invention.

DETAILED DESCRIPTION OF PREFERRED EMBODIMENT OF THE INVENTION

Referring now to the accompanying drawings, the machine of this invention, in its preferred form, comprises a disc-like turret or turntable 5 which is mounted on a machine frame 6 for rotation about an axis that is preferably horizontal. Spaced around the turret 5 at regular circumferential intervals are pairs of carrier jaws, each pair consisting of a relatively fixed jaw 7 and a relatively movable jaw 8. Both carrier jaws are elongated and paddle-shaped, and both project lengthwise forwardly from a front face of the disc-like turret 5.

The fixed jaw 7 of each carrier jaw pair is secured directly to the turret 5, whereas the movable jaw 8 is carried at one end of a lever arm 9 that has a pivotal connection 10 to the turret 5 and overlies its front face, so that swinging of the lever arm 9 carries the movable jaw 8 toward and from the cooperating fixed jaw 7. The carrier jaws 7, 8 are preferably oriented with their broad surfaces facing substantially circumferentially relative to the turret 5, and they thus flatwise oppose one another to cooperate in carrying a stacked pack 11 of paper towels or paper napkins or pack of sponges or of a similar resiliently compressible product.

Figure 1:
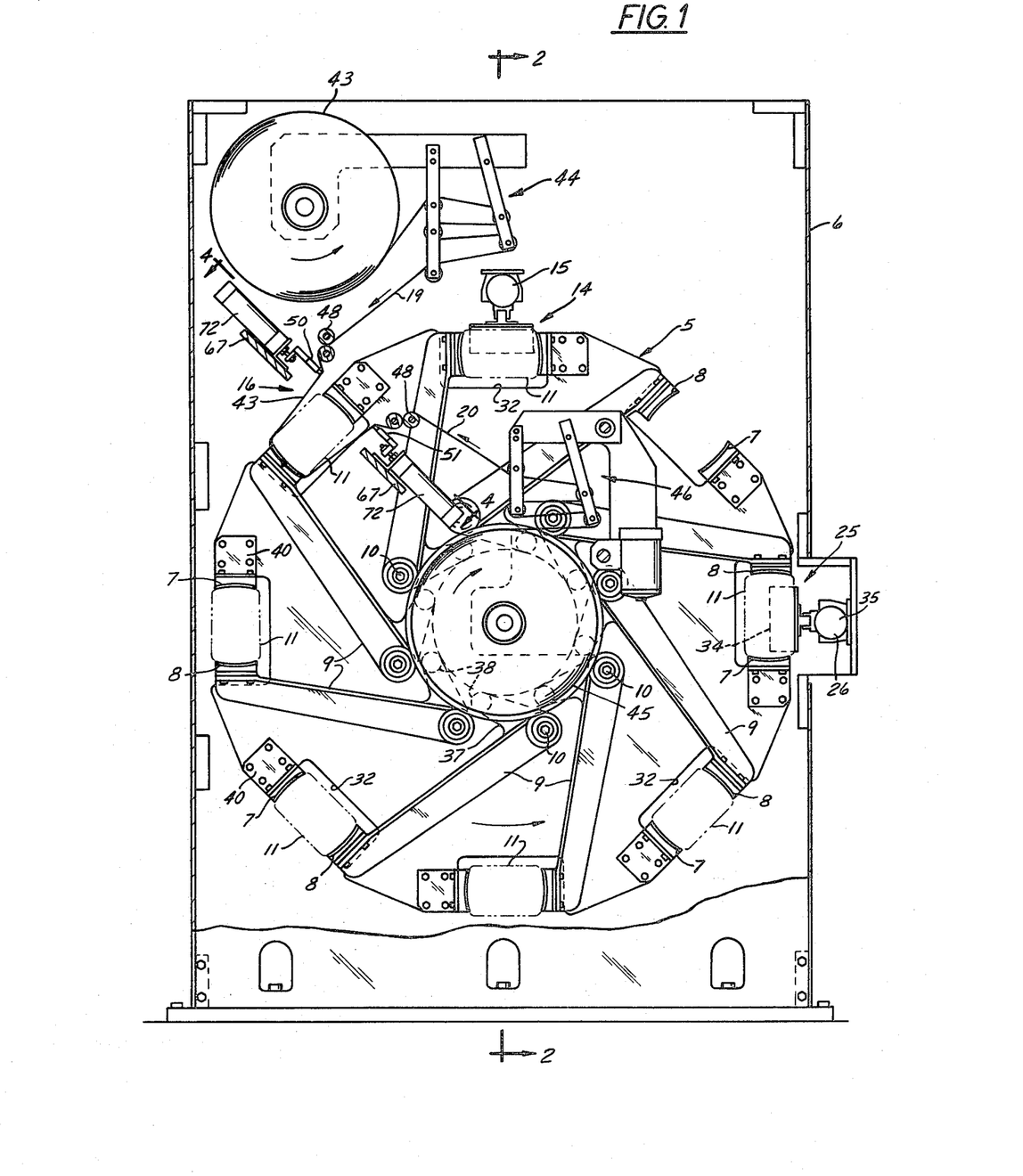
FIG. 1 is a view in elevation of a packaging machine embodying the principles of this invention.

The turret 5 is indexingly rotated (counterclockwise, as shown in FIG. 1), as by means of a known indexing drive 12. The turret 5 thus comprises a carrier where-by each pair of carrier jaws 7, 8 is intermittently transported along a defined path which is in this case a circular orbit. Each indexing motion brings one of the pairs of carrier jaws 7, 8 to a loading station 14 at which a pack 11 of product is inserted between the jaws by loading mechanism 15 that is described hereinafter. The next indexing motion carriers the newly-loaded pair of carrier jaws 7, 8 to a banding station 16, also described hereinafter, at which a band 17 of light thermoplastic sheet material is formed around the jaws and the product pack 11 between them. Two webs 19, 20 of thermoplastic sheet material, equal to width, are cut and fused across their widths to form the band 17, and the segments of those webs that comprise each band are connected by two heat-bonded seams 22, 23 (best seen in FIG. 9).

During several subsequent indexing movements of the turret 5, the seams 22, 23 on the band 17 are permitted to cool as the banded pack 11 is moved orbitally towards an unloading station 25; and when the banded pack reaches that station, it and its band 17 are pushed axially forwardly off of the carrier jaws 7, 8 by an unloading mechanism 26. Subsequent indexing movements of the turret 5 bring the carrier jaws 7, 8 back to the loading station 14 and through a repetition of the cycle.

The product packs 11, which have been made up in a known manner, are brought to a location which is, in this embodiment, behind and below the loading station 14 of the machine. The loading mechanism 15 at the loading station 14 comprises a bifurcated transfer arm 28 (FIG. 2) that is swingably mounted on the back of the machine frame 6 and is swung up and down by a double-acting cylinder actuator 29 that is connected between it and the machine frame 6. The loading mechanism 15 also comprises a pusher 30 that is moved forwardly and rearwardly by another double-acting cylinder jack 31. The cylinder jacks 29 and 31, as well as other cylinder jacks identified hereinafter, are preferably pneumatic.

Figures 2, 3:
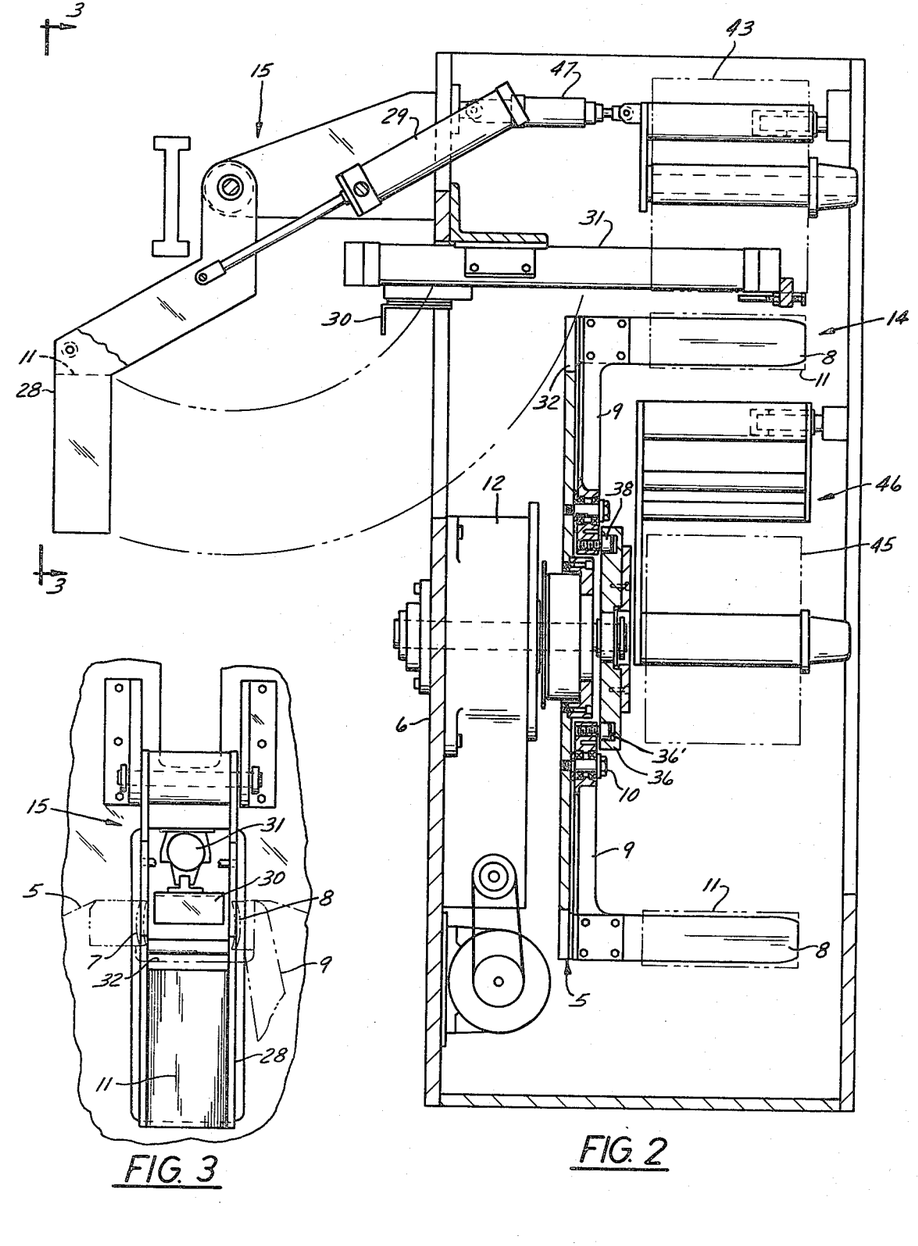
FIG. 2 is a view in section, taken on the plane of the line 2—2 in FIG. 1.
FIG. 3 is a fragmentary view in section, taken on the plane of the line 3—3 in FIG. 2.
Figure 13:
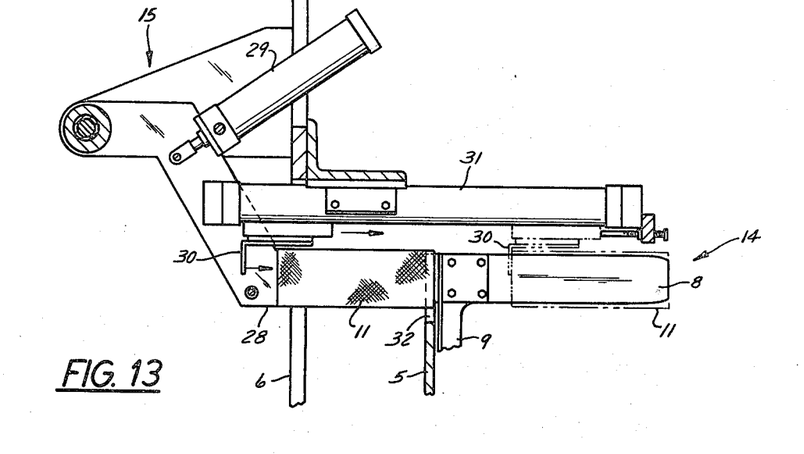
FIG. 13 is a view of the loading station, partly in elevation and partly in vertical section through the turret.

In the lowered loading position of the transfer arm 28, in which it is shown in FIG. 2, a somewhat compressed pack 11 of product is inserted between its bifurcations in a known manner, and the transfer arm is then swung forwardly and upwardly by its actuator 29 to bring the pack to a position (FIG. 13) rearwardly in line with the pair of carrier jaws 7, 8 at the loading station 14. The pusher 30 then moves the pack 11 in an axially forward direction, to insert the pack between the jaws 7, 8, bringing the pack to the position shown in broken lines in FIG. 13. To permit the product pack 11 to pass through the disc of the turret 5 in moving forwardly into the grip of the carrier jaws 7, 8, the peripheral portion of the turret has a cut-out or bay 32 at each pair of carrier jaws.

Figures 6, 8:
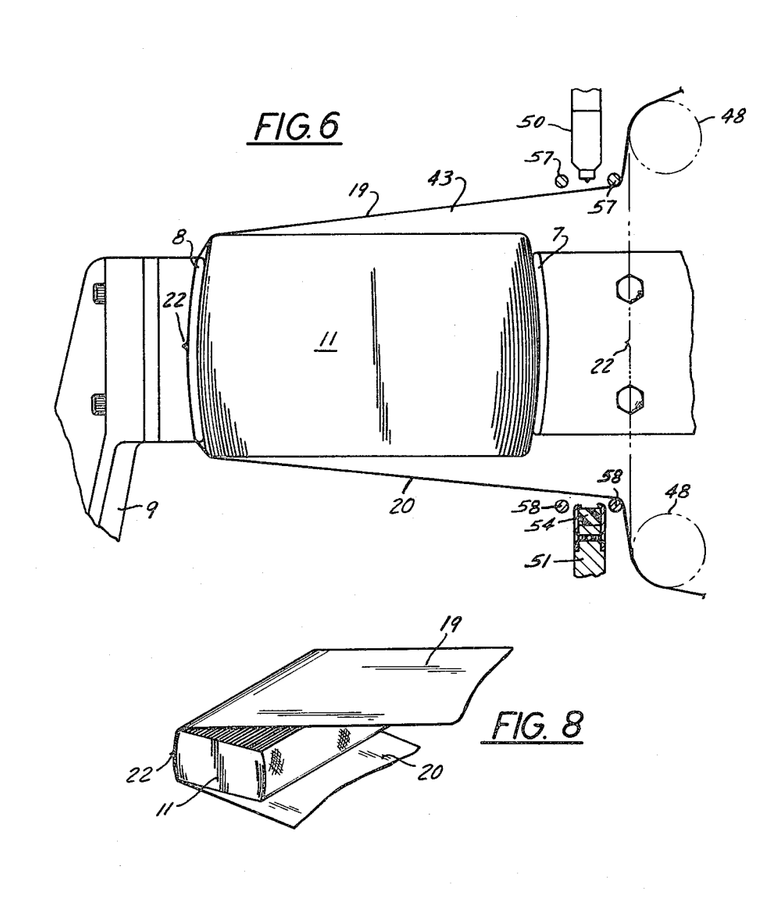
FIG. 6 is a more or less diagrammatic detail view showing the relationship between carrier jaws and connected webs in an intermediate portion of a band forming operation.
FIG. 8 is a diagrammatic perspective view showing the relationship between a pack of product and the connected webs at the stage of the operation depicted in FIG. 6.
Figures 7, 9:
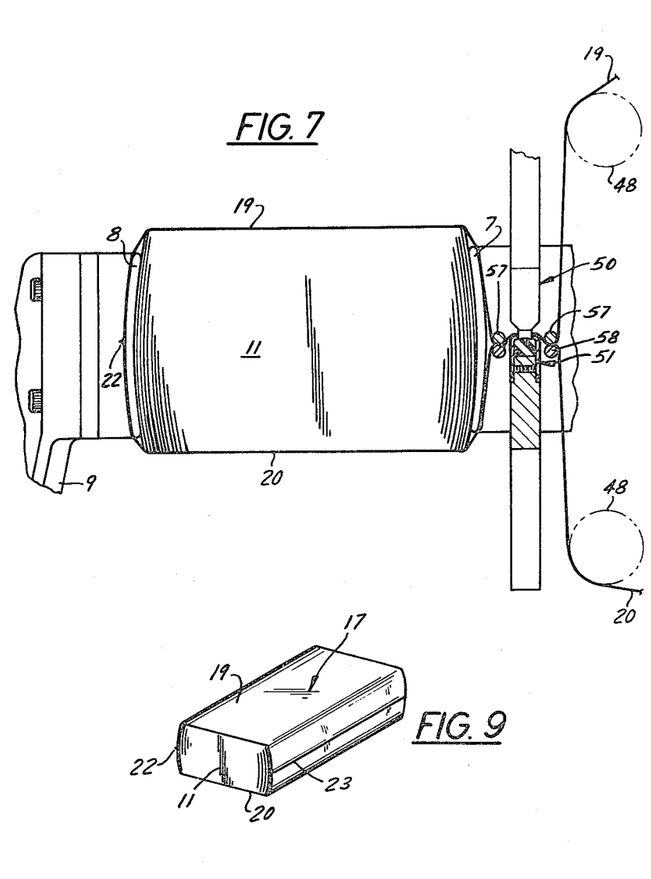
FIG. 7 is a view generally similar to FIG. 6 but showing the webs in relation to the carrier jaws just at the conclusion of the band forming operation.
FIG. 9 is a view similar to FIG. 8 but showing the completed package formed by the apparatus of this invention.

As carried by the jaws 7, 8, the products in the pack have their front edges substantially flush with the front edges of the jaws. Furthermore, it is to be observed that (as best seen in FIGS. 6 and 7) the carrier jaws 7, 8 are somewhat narrower than the product pack, so that portions of the pack project beyond the longitudinal edges of the jaws.

The loading mechanism 15 can be controlled to operate in response to the presence of a pack of product in a zone or location from which the pack is fed into the transfer arm 28. The means for effecting such control can comprise photoelectric cells (not shown) or other devices of a type that will be obvious to those skilled in the mechanical arts, and such persons will likewise have no difficulty in arranging suitable means for coordinating the operation of the pusher actuating jack 31 with operation of the actuator 29 that swings the transfer arm 28. With the provision of such control means, the machine can operate on a demand basis, as and when packs are fed to it.

It will be apparent that indexing motions of the turret 5 must be coordinated with operation of the loading mechanism 15, and that the operation of certain other components of the machine, including the unloading mechanism 26, must in turn be coordinated with turret indexing motions. Again, the provision of suitable instrumentalities for effecting such coordination is well within the ordinary abilities of those skilled in the art. However, it might be mentioned that in the preferred form of the machine, the indexing drive 12 for the turret 5 is of a commercial type wherein a continuously running motor is connectable with the indexing drive mechanism through an electric clutch-brake that is energized for effecting each indexing advance of the turret; and in that case, energization of the electric clutch-brake is coordinated with operation of the loading mechanism 15.

At the loading station 14 the carrier jaws 7, 8 are in a relatively diverged condition, being spaced apart by a slightly greater distance than the distance between the bifurcations of the transfer arm 28, so that the pack 11, while being maintained under substantial compression, can readily be slid forwardly from the grip of the transfer arm into the grip of the carrier jaws. As the turret 5 carries the pack-carrying jaws 7, 8 towards the banding station 16, the jaws are converged to further compress the pack of product that they carry. When the band 17 is initially formed at the banding station 16, it fits slackly around the carrier jaws 7, 8 and the pack 11 between them; and as the jaws move away from the banding station they are diverged just enough to take up the slack in the newly-forward band 17 without tensioning it. The carrier jaws 7, 8 then maintain their relative positions through several subsequent indexing movements, to allow time for cooling of the heat-fused seams 22, 23 of the newly-formed band 17. As the jaws 7, 8 approach the unloading station 25 they are further diverged, to somewhat relieve compression on the pack 11 between them while tensioning the band 17. Such tensioning brings the stretches of the band that bridge the jaws 7, 8 into firm engagement with the portions of the pack that project beyond the longitudinal edges of the jaws, so that the band 17 and the pack 11 tend to move in unison as they are slid axially forwardly out of engagement with the jaws 7, 8 at the unloading station 25. The pack 11 is therefore within the embrace of the band 17 as the pack and the band leave the carrier jaws, and the pack expends to fill and tension the band.

The unloading mechanism 26 (FIG. 1) at the unloading station 25 comprises a pusher 34 that is actuated by a double-acting cylinder jack 35. The unloading movement of the pusher carries it forwardly between the carrier jaws 7, 8, all the way to their front edges, and as it moves forward it is engaged with both the pack 11 between the jaws and the band 17 around them.

Figures 15, 16:
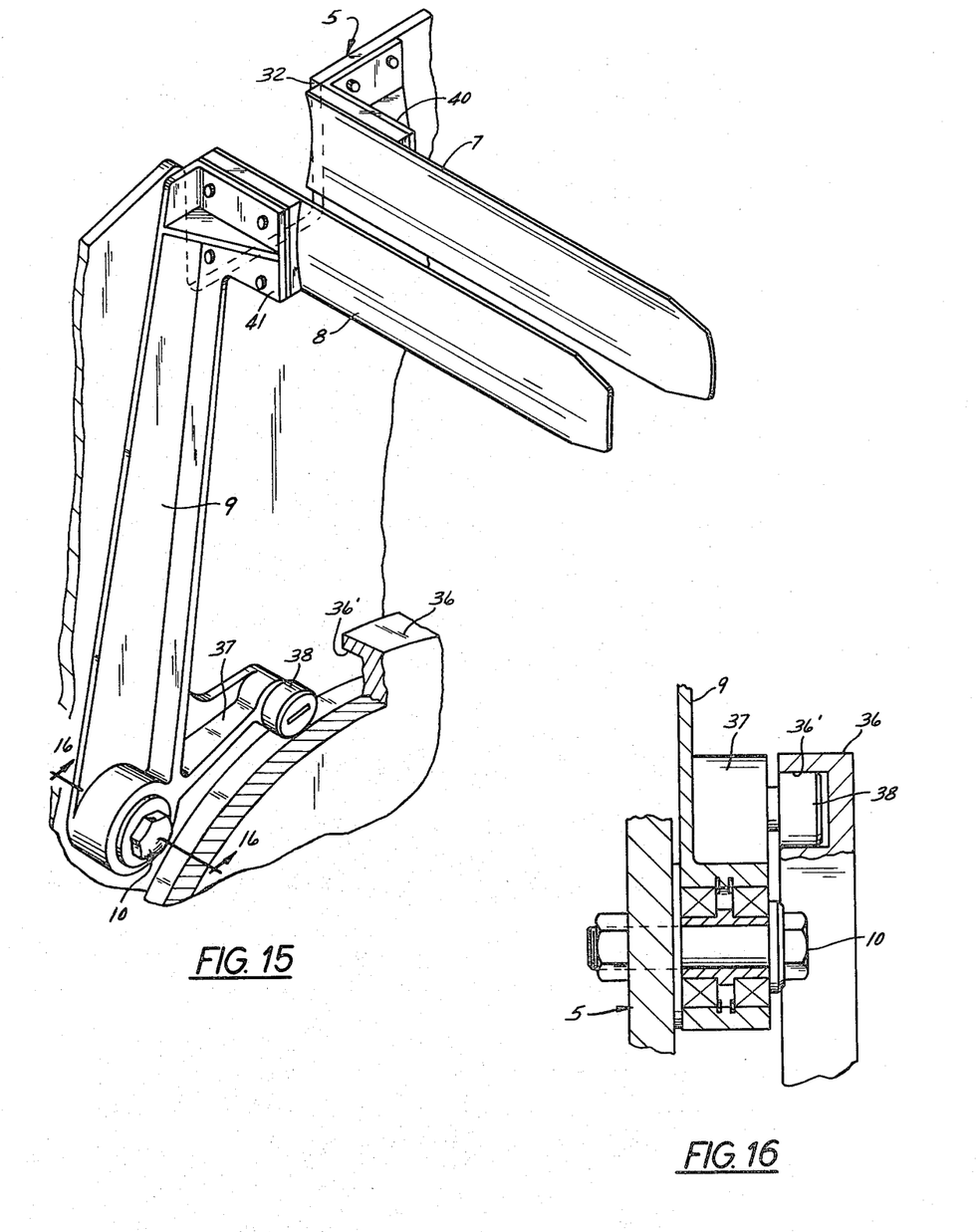
FIG. 15 is a fragmentary perspective view of a part of the turret, with portions broken away, showing one of the pairs of carrier jaws and the means for controlling relative convergence and divergence thereof.
FIG. 16 is a detail sectional view taken on the plane of the line 16—16 in FIG. 15.

The above described divergence and convergence of the carrier jaws 7, 8 is due to controlled movement of the lever arm 9 that carries the movable member 8 of each carrier jaw pair. Each such lever arm 9 is part of a bell crank (FIG. 15) that further comprises another lever arm 37 which carries a cam follower roller 38 at its outer end. The several cam follower rollers 38 cooperate with a face cam 36 (FIG. 16) that is coaxial with the turret 5 but is confined against rotation, riding in the groove 36' of that cam.

Each fixed carrier jaw 7 is mounted on an L-shaped bracket 40 that is secured to the turret 5, and the movable jaw 8 is similarly connected to the lever arm 9 by means of an L-shaped bracket 41. It will be apparent that the distance between the carrier jaws 7, 8 can be adjusted to accommodate packs of different thicknesses by the insertion of shims between the brackets 40, 41 and the respective jaws 7, 8 carried by them.

Figure 14:
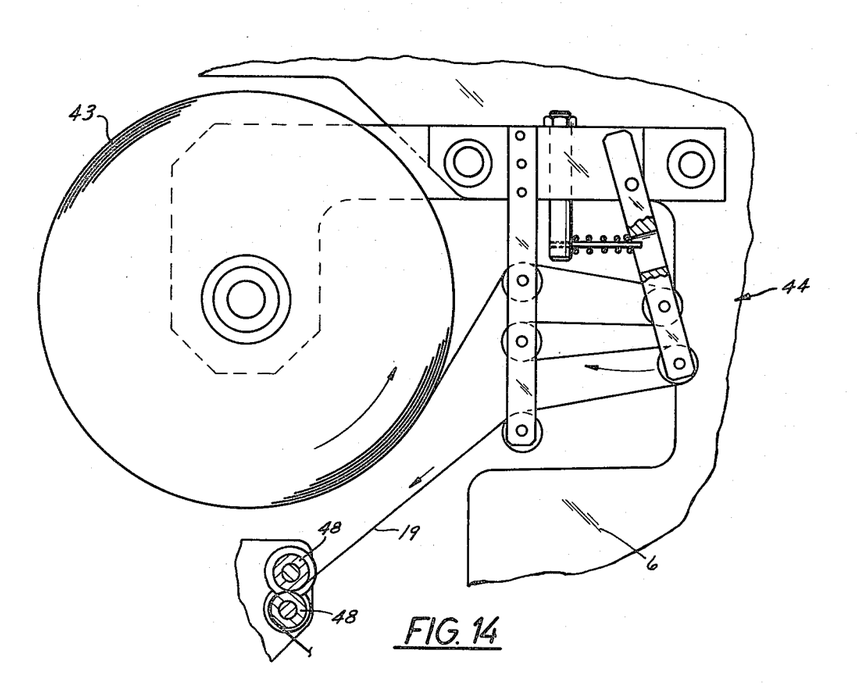
FIG. 14 is a view in elevation of the web supply and web guiding means for one of the webs.

As a pair of carrier jaws 7, 8 approaches the banding station 16, it is moving towards what is, in effect, a continuous strip of thermoplastic sheet material that extends across its path. In fact that strip comprises the connected end portions of the two webs 19, 20, which webs are respectively guided towards the path of the approaching carrier jaws from opposite sides of that path. The web 19 is drawn off of a supply roll 43 (FIGS. 1 and 14) that is mounted on the machine frame 6 for unrestrained rotation about an axis which is fixed at a substantial distance radially outwardly from the periphery of the disc-like turret 5. After leaving the supply roll 43, the web 19 zig-zags through the rollers of a generally conventional festoon or take-up device 44 that allows the supply roll 43 to be unwound at a relatively steady rate of rotation even though the free end of the web 19 is advanced at rather substantially varying rates.

The other web 20 is drawn off of a freely rotatable supply roll 45 that is mounted coaxially with the turret 5, and the web 20 likewise passes over a festoon or take-up device 46.

The mounting means for each of the supply rolls 43, 45 includes means comprising a double-acting cylinder jack 47 for adjusting the axial position of the roll so that its web will track properly with the other web and with the path of the carrier jaw pairs 7, 8. It will be understood that the tracking adjustment jacks 47 are actuated in response to suitable sensors (not shown) which monitor the edgewise positions of the webs.

For each of the webs 19, 20 there is a pair of guide rollers 48, the respective pairs of guide rollers being located at opposite sides of the path along which the carrier jaws 7, 8 move, and closely adjacent to that path. Each web 19, 20 thus extends from its supply roll 43, 45, through its take-up device 44, 46, then to and around its pair of guide rollers 48, and thence across the path of the carrier jaws 7, 8 to its seam connection 22 with the other web. Each of the rollers of each guide roller pair 48 rotates on a fixed axis and is equipped with a one-way clutch of a known type that allows it to rotate freely in the direction of advance of its web 19, 20 but prevents it from rotating in the opposite direction in response to the longitudinal tension force exerted upon its web 19, 20 by its take-up device 44, 46.

In addition to the two sets of guide rollers 48, the apparatus at the banding station 16 includes a pair of reciprocating members 50, 51 that comprise pressure jaws whereby the connected webs 19, 20 are formed into a band 17 around each pair of carrier jaws 7, 8 that passes the banding station 16 and whereby the material comprising each such band is severed from the remainder of the webs 19, 20 at the same time the the webs are reconnected with one another to provide for formation of the next band.

The pressure jaw member 50 comprises an electrically heated cutting and heat-bonding element 53, while the cooperating pressure jaw member 51 comprises a resilient pressure reaction member 54. Each of the pressure jaws 50, 51 is elongated in the direction widthwise of the webs 19, 20 and has a length to extend completely across the webs. The path of reciprocation of the pressure jaws 50, 51, which is substantially normal to the path of the carrier jaws 7, 8, is spaced from the guide rollers 48 by a small distance in the direction of indexing motion of the carrier jaws.

Figure 4:
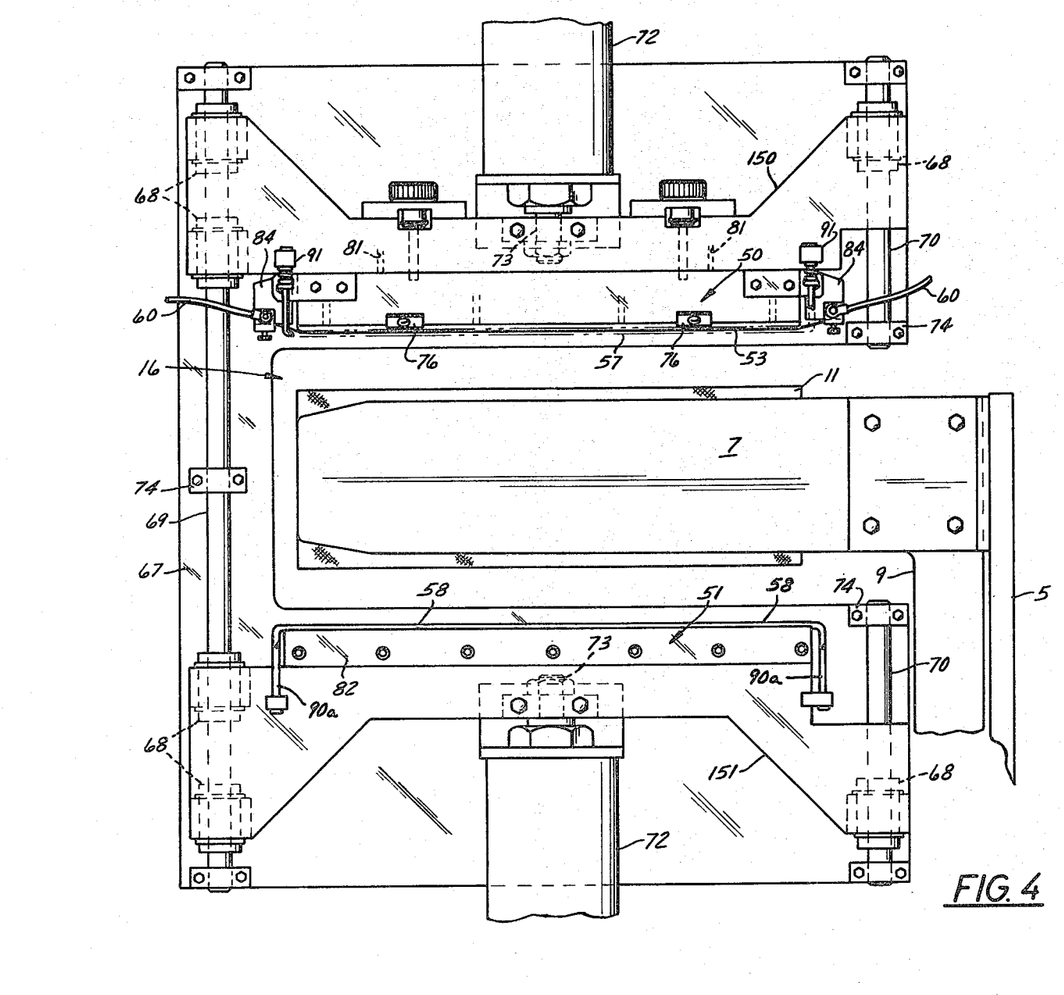
FIG. 4 is a view in section, on an enlarged scale, taken on the plane of the line 4—4 in FIG. 1.
Figure 5:
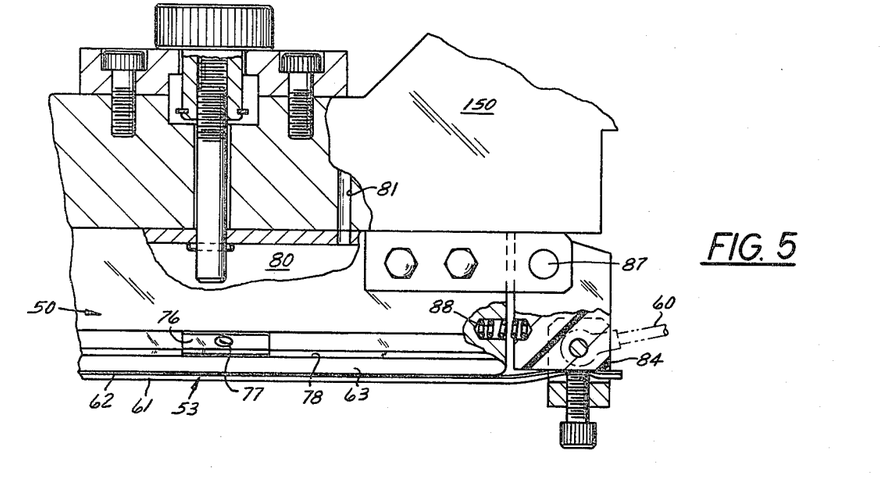
FIG. 5 is a fragmentary view on a further enlarged scale, taken on the same plane as FIG. 4.

As a pair of carrier jaws 7, 8 approaches the banding station 16, the pressure jaws 50, 51 are in their diverged or retracted positions shown in FIGS. 2 and 4, clear of the path of the carrier jaws. The carrier jaws 7, 8 can therefore move into engagement with the strip of thermoplastic material which extends across their path between the sets of guide rollers 48 and which comprises the connected end portions of the webs 19, 20. As the pair of carrier jaws 7, 8 continues its advance, it cooperates with the sets of guide rollers 48 to draw out that strip into a U-shaped loop 43 (FIGS. 1 and 6) that embraces the carrier jaws and the product pack 11 between them. In the final stage of the drawing-out of this U-shaped loop 43, the legs of the loop come into contact with control bars 57, 58 on the respective pressure jaw members 50, 51.

When the pair of carrier jaws 7, 8 has moved all the way to its banding-station position (FIG. 6), the pressure jaws 50, 51 move towards one another behind the fixed carrier jaw 7. Such convergent motion of the pressure jaws 50, 51 brings together the legs of the U-shaped loop 43 so that it now completely surrounds the carrier jaws 7, 8 as well as the product pack 11 carried by them. The two layers of thermoplastic material thus brought together by the pressure jaws 50, 51 are clamped between the electrically heated element 53 and the resilient pressure reaction member 54 (FIG. 7). The electrically heated element 53 is so arranged (as explained hereinafter) that by reasons of its heat and the clamping force exerted by the pressure jaws 50, 51, a cut 59 is made through both layers of plastic, all across the width of each, and simultaneously the two layers are heat-bonded to one another along both sets of their edges that result from the cut 59, so that such heat bonding produces the two fused seams 22 and 23. The seam 23, which is directly adjacent to the fixed carrier jaw 7, connects the ends of the plastic loop 43 that has been formed around the pack 11 and the carrier jaws 7, 8, so that said loop becomes a complete closed band 17. By reason of the cut 59 that has been made through the two layers of plastic, the newly-formed band 17 is severed from the two webs 19, 20. The other seam 22 constitutes a new connection between the free ends of the webs 19, 20, providing a new strip extending between the sets of guide rollers 48, ready to be drawn into a U-shaped loop by the next carrier jaw pair 7, 8, in a repetition of the banding operation just described.

When formation of the band 17 is completed and the pressure jaw members 50, 51 move back to their diverged (FIG. 1) positions, clear of the path of the carrier jaw pairs, the band 17 fits somewhat loosely around the carrier jaws 7, 8 and the pack 11 between them, as will be apparent from consideration of FIG. 7. It is for this reason that the jaw control cam 36 causes the movable carrier jaw 8 to move slightly away from its cooperating fixed jaw 7 as the carrier jaw pairs moves away from the banding station 16, to take up the slack in the band 17 without imposing any substantial tension upon it that might break its seams 22 and 23, which are still hot and soft.

As the carrier jaws 7, 8 approach the unloading station 25, the seams 22 and 23 have been cooled nearly to ambient temperature, and the movable carrier jaw 8 is further diverged from the fixed jaw 7, to place the band 17 under definite tension and bring substantial portions of the band into firm engagement with the pack 11, as explained above.

Returning now to a more detailed consideration of the cutting and bonding means of this invention, the electrically heated element 53 is a metal strip or flat wire which has its opposite ends connected with the terminals of a current source, as by means of conductors 60 (FIG. 4). A suitable material for the strip 53 is a nickel-chromium alloy such as is commonly used for electric resistance heating elements. Since the strip 53 is only very briefly engaged with thermoplastic material during each severing and seam-fusing operation, it is preferably fed with direct current, to ensure that its temperature will be the same from operation to operation.

The strip or heated element 53 has bends along its length that define a medial narrow ridge 61 of V-shaped cross-section. That ridge 61 projects fowardly beyond flat, coplanar side portions 62 that constitute the remainder of the strip, and it forms a cut 59 while the coplanar portions 62 form the seams 22, 23. Backing up the strip 53 so that pressure can be applied through it is a long, narrow channel-shaped member 63, preferably of aluminum, having a uniform U-shaped cross-section along substantially its entire length. This supporting member 63 has an exterior coating 64 of a material, such as ceramic, which is substantially a nonconductor of electric current but is a reasonably good conductor of heat. The coating 64 covers at least the bight portion of the U-section supporting member, but preferably, as shown, it also extends over its legs, which project rearwardly from its bight portion. As explained hereinafter, the supporting member 63 is cooled, as by a flow of air through its interior that is preferably interrupted during each sealing operation.

Figure 12:
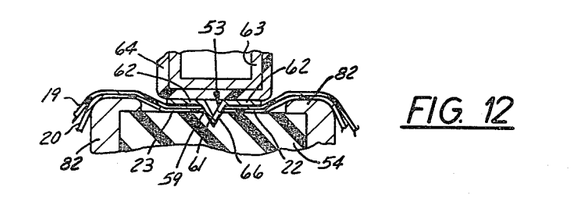
FIG. 12 (on sheet 4) is a more or less diagrammatic sectional view through the pressure jaws, showing the zones of cutting and of seam fusing.

Since the heated metal strip 53 has a substantially uniform thickness all across its width and all along its length, it tends to be heated uniformly by current flowing through it. However, its coplanar side portions 62, which are in flatwise contact with the flat front surface of the supporting member 63, give up a certain amount of heat to that supporting member and therefore remain at a somewhat lower temperature than its V-section ridge protion 61, which is spaced forwardly from the supporting member 63 (as best seen in FIG. 12) and is therefore not in direct heat transfer relationship to it. The ridge 61 is therefore hot enough to cut quickly through the thermoplastic material, while the cooler coplanar portions 62 merely soften the material sufficiently to form the fused or heat-bonded seams 22, 23 at opposite sides of the cut 59 produced by the ridge. It will be apparent that the U-section member 63 serves as a heat sink as well as providing support for the heated element 53.

In addition to being hotter than the coplanar portions 62, the ridge 61 also exerts more pressure on the plastic material than said coplanar portions, and such higher pressure also helps to account for the ability of the ridge 61 to cut through thermoplasic material. This pressure relationship is due to cooperation of the heated element 53 with the resilient pressure reaction member 54 into which the ridge 61 penetrates (FIG. 12) to make the cut 59, while the seam-forming portions 62 of the strip cooperate with opposing substantially undeformed portions of the surface of the resilient member 54 to form seams 22, 23.

The front surface of the metal strip 53 can be covered with a thin tape 66 of high-melting point plastic (e.g., Teflon) that prevents the thermoplastic material from sticking to it. The pressure reaction member 54 is preferably of silicone rubber or a similar material that separates readily from softened plastic, or it too can be overlain by a suitable high-release tape.

As best seen in FIG. 4, the two pressure jaw members 50, 51 are carried for reciprocation on a plate-like U-shaped bracket 67 on the machine frame 6, which straddles the path of the carrier jaw pairs 7, 8 and on which there are fixed, parallel guide shafts 69, 70 that extend in the directions of reciprocation of the pressure jaw members. Each of the pressure jaw members 50, 51 comprises a bar-like carriage member 150, 151, respectively, having ball bushings 68 on its opposite ends that ride on the guide shafts 69, 70. For each of the bar-like carriage members 150, 151 there is a double-acting pneumatic actuator comprising a cylinder 72 that is affixed to the U-shaped bracket 67 and a piston that has its rod 73 connected to the carriage member.

Supports 74 for the guide shafts 69, 70 can comprise stop abutments which define a limit of inward motion of one of the pressure jaw members—e.g., the pressure jaw member 51 that carries the resilient pressure reaction member 54. The air fed to the actuator 72, 73 for that pressure jaw member 51 is at somewhat higher pressure than air fed to the other pressure jaw member 50 so that the pressure jaw member 51 is caused to move faster than the cooperating member 50 and is brought into engagement with the abutments 74 before the cooperating member 50 finishes its stroke. As a result, the pressure jaw member 51 is always in a position defined by the abutments 74 whenever the other pressure jaw member 50 comes into clamping relationship to it for seam bonding, and consequently all bands formed by the machine have their respective seams 22, 23 uniformly located in relation to the packs 11 that they surround. In addition, the front seam 22 that is formed at each convergence of the pressure jaws 50, 51 maintains its position relative to the path of the packs 11 because neither of the webs 19, 20 can be drawn lengthwise rearwardly by tension in its takeup device 44, 46, owing to the one-way clutches associated with the guide rollers 48. These one-way clutches also prevent tension from being imposed upon newly-fused front seams 22.

The bar-like carriage member 150 on which the heated element 53 is carried has a lengthwise extending forwardly opening groove in its front end in which the supporting member 63 is received with a close fit. The supporting member is readily detachably held in this groove by means of clips 76 at opposite sides of the carriage member 150, secured to the latter by means of screws 77 that are received in threaded holes in the carriage member. The clips 76 engage in longitudinally extending grooves 78 in the opposite sides of the supporting member 63.

Because of the U-shaped cross-section of the heat sink supporting member 63, it cooperates with the carriage member 150 that carries it to define an air channel 80 in which cooling air flows. Bores 81 in the carriage member 150, openig to the channel 80, provide passages through which cooling air can be fed into this air channel and exhausted from it, to provide for a constant flow of cooling air in contact with the supporting member 63.

End portions of the electrically heated strip 53 project beyond the supporting member 63 to be received in connector blocks 84 whereby the strip 53 is detachably mounted on the carriage member 150 and is electrically connected to the conductors 60. Each connector block 84 has a slot through which its end portion of the strip 53 extends, and a set screw 85 that is threaded into the connector block secures the strip 53 to the block 84 and provides for a good electrical connection with the conductor 60.

Each of the connector blocks 84 has a pivotal connection 87 with the carriage member 150, about which the connector block can swing in directions lengthwise of the strip 53, toward and from its adjacent end of the supporting member 63; and an expansion spring 88, reacting between each connector block 84 and the carriage member 150, biases the connector block away from the adjacent end of the supporting member 63 to maintain the metal strip 53 under lengthwise tension.

The slot in each connector block 84 is so located as to dispose the end portion of the strip 53 in rearwardly offset relation to the plane of the flat front surface of the supporting member 63; hence, the lengthwise tension that is imposed upon the strip 53 by the springs 88 holds the strip with its coplanar seam-forming portions 62 in good flatwise heat transferring engagement with the supporting member 63.

The resilient pressure reaction member 54, which can be of square or rectangular cross-section, is held in place on the front of the carriage member 151 by means of parallel side plates 82 that are detachably secured to opposite sides of that carriage member. Each of the side plates 82 has an inturned edge portion that projects a little distance laterally inwardly across the working face of the pressure reaction member 54 to secure it to the carriage member 151.

Figure 10:
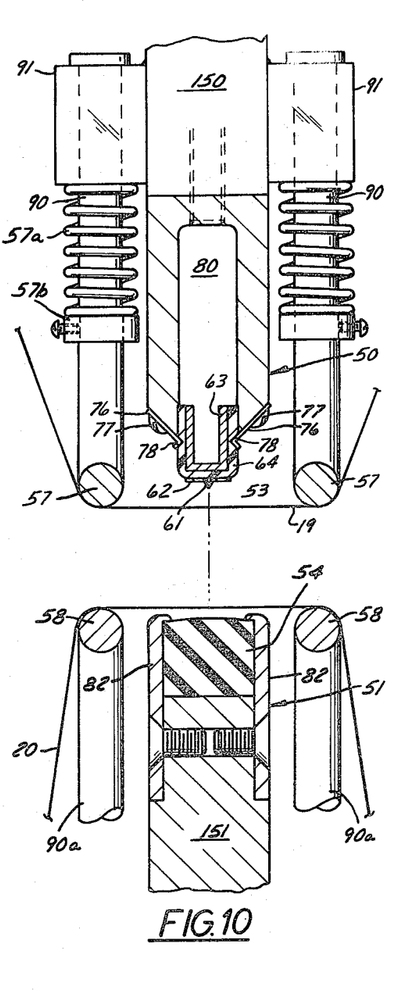
FIG. 10 (on sheet 3) is a large scale detail view in vertical section through the pressure jaws, showing them in their open or inoperative condition.
Figure 11:
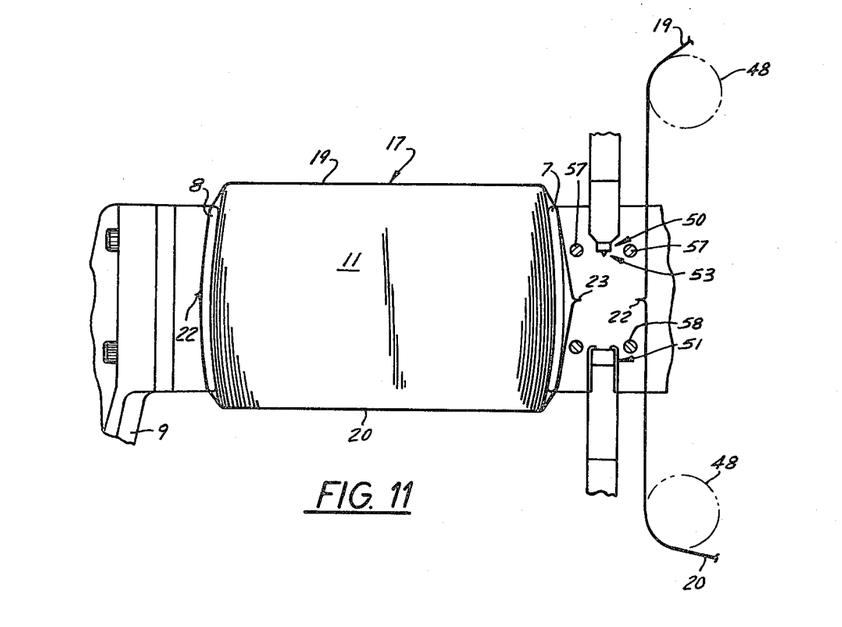
FIG. 11 (on sheet 4) is a view generaly similar to FIG. 7 but showing the pressure jaws moving away from their clamping relationship.

At each side of the pressure jaw member 50 that comprises the heated element 53, there is a web detaching bar 57 that slidingly engages the web 20 during converging motion of the pressure jaw members. Each of the web detaching bars 57 comprises the straight, elongated bight portion of a U-shaped member which can be bent from rod stock or heavy wire and which has parallel legs 90 that are slidably received in tubular guides or holders 91 fixed to opposite sides of the carriage member 150. A coiled compression spring 57a surrounds each leg 90 and reacts between its holders 91 and a collar 57b on the leg, to bias the bar 57 towards a normal extended position in which it is shown in FIG. 10.

The other pressure jaw member 51 likewise carries a pair of web detaching bars 58, one at each side of it, in forwardly lengthwise spaced parallel relation to the pressure reaction member 54. As shown, the web detaching bars 58 comprise U-shaped members having their parallel legs 90a fixed in tubular holders 91a on the carriage member 151. It will be evident that the web detaching bars 58 could be mounted for extending and retracting movement relative to the carriage member 151, in correspondence with the mounting of the web detaching bars 57 on the carriage member 150.

It will be evident that when the web detaching bars 57 are in the normal positions to which they are biased, they cooperate to define a plane that is spaced ahead of the electrically heated element 53; and the web detaching bars 58 similarly define a plane which is spaced forwardly of the pressure reaction member 54. Furthermore, the respective bars 57 and 58 are opposite one another, so that in the last stages of convergence of the pressure jaw members 50, 51 the bars 58 force the bars 57 to retract, compressing the springs 57a. As the pressure jaw members 50, 51 move apart at the conclusion of a cutting and seam bonding operation, the bars 57 advance relative to the jaw member 50, moving back toward their normal position, and they thus detach the web 19 from the heated element 53 in case the web has any tendency to stick to it. It will be apparent that during the initial stages of convergence of the pressure jaw members 50, 51 the web detaching bars 57 on the jaw member 50, which are then in their normal positions, prevent the material of the web 19 from contacting the heated element 53.

From the foregoing description and the accompanying drawings it will be apparent that this invention provides a machine for forming a band of light thermoplastic material around resiliently compressible product such as a stack of paper towels or paper napkins, and that the machine of this invention comprises a simple, inexpensive and highly effective electrically heated element whereby a cut can be made through plural, flatwise superimposed layers of thermoplastic sheet material and, simultaneously, heat-bonded seams can be formed along the respective edges of the sheets of material at each side of the cut.

What is claimed as the invention is:

1. Apparatus for forming packages, each comprising a band of thermoplastic sheet material that snugly surrounds a quantity of a resiliently compressible product and maintains it under substantial compression, said apparatus being characterized by:
   A. a turret rotatable about an axis and having a radially outwardly opening bay in its periphery that extends axially therethrough to have open ends and is carried in one orbital direction by turret rotation successively past a loading station, a banding station and an unloading station;
   B. a pair of elongated, blade-like carrier jaws, each having at one of its ends a connection with said turret,
      (1) said connections disposing the carrier jaws
         (a) at circumferentially opposite sides of said bay,
         (b) both projecting lengthwise in one axial direction from said turret, and
         (c) with a lengthwise extending surface of each in opposing relation to a surface of the other, and
      (2) the connection of one of said carrier jaws with the turret comprising a lever having
         (a) an attachment portion to which said one end of said one carrier jaw is fixed,
         (b) a fulcrum connection with the turret that is spaced from said attachment portion, and
         (c) a cam follower spaced from said attachment portion and said fulcrum connection;
   C. a loading pusher at said loading station;
   D. means for moving said load pusher in a direction parallel to said opposing surfaces of the carrier jaws for inserting a quantity of product between them;
   E. banding means at said banding station for
      (1) causing a portion of a web of thermoplastic sheet material to form a loop embracing the carrier jaws and product between them,
      (2) producing at least one seam which forms the loop into a closed band surrounding the carrier jaws and product between them, and
      (3) severing said band from the remainder of the web;
   F. a cam substantially concentric with said turret and confined against rotation, said cam being engaged by said cam follower and being arranged to swing said lever
      (1) to move said one carrier jaw towards the other when the carrier jaws are between the loading station for compressing the product that has been inserted between the jaws and the banding station and
      (2) to move said one carrier jaw away from the other when the carrier jaws are between the banding station and the unloading station for tensioning the band into contact with the portions of the product that are exposed between the jaws;
   G. an unloading pusher at said unloading station; and
   H. means for moving said unloading pusher in said one axial direction through the open ends of said bay and between said carrier jaws to effect simultaneous disengagement from them of product inserted between them at the loading station and a band installed around them at the banding station.

2. The apparatus of claim 1, further characterized by:
   I. both said loading pusher and said unloading pusher being constrained to reciprocating motion in directions substantially parallel to said axis.

3. The apparatus of claim 2 wherein said loading pusher and said unloading pusher are spaced from the turret in the direction opposite to said one axial direction when they are in retracted positions away from the carrier jaws.

4. The apparatus of claim 1, wherein said banding means comprises:
   (1) guide means spaced radially to opposite sides of the orbit of said carrier jaws for guiding each of a pair of webs of thermoplastic sheet material towards said orbit;

(2) first seam bonding means for forming a first seam that connects the adjacent ends of said webs, substantially all across the width of each, so that the connected end portions of said webs comprise a band strip which extends across said orbit and which is drawn out into a U-shaped open loop that embraces said carrier jaws as they move in said one orbital direction in contact with the band strip (3) pressure jaw means arranged to converge across said orbit from radially opposite sides thereof and by which the opposite legs of said open loop are brought into contact with one another behind said carrier jaws;

(4) second seam bonding means carried by said pressure jaw means for forming a second seam substantially simultaneously with said first seam, which second seam is parallel to said first seam and is spaced a small distance in said orbital direction from said first seam, said second seam forming said band strip into a closed band; and (5) cutting means carried by said pressure jaw means and arranged to make a cut through the materials of both of said webs, which cut is made substantially simultaneously with formation of said first and second seams and is between those seams to sever said closed band from said webs.

* * * * *